Dec. 13, 1938.   H. HENKE   2,140,228.
ELECTRICALLY HEATED FURNACE
Filed March 27, 1936
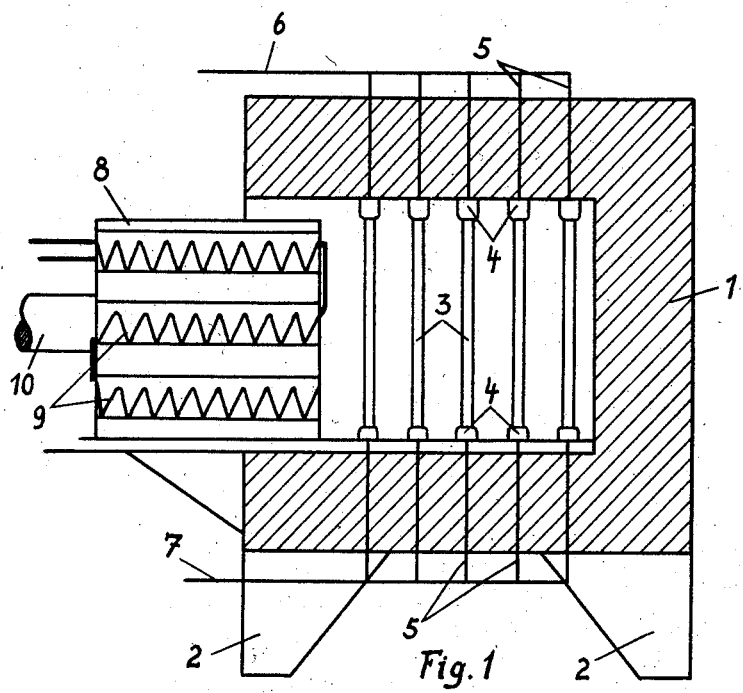
Fig. 1
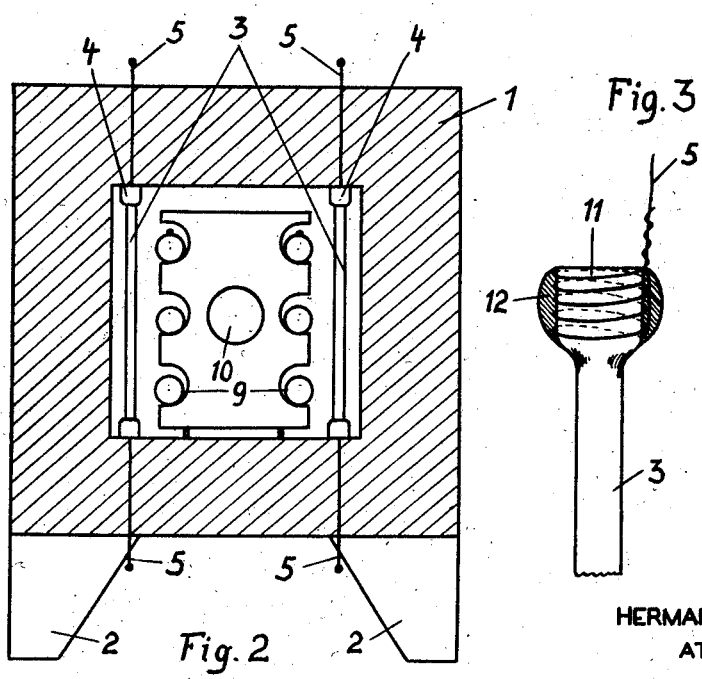
Fig. 2
Fig. 3
INVENTOR:
HERMANN HENKE
ATTORNEYS:

Patented Dec. 13, 1938

2,140,228

UNITED STATES PATENT OFFICE 2,140,228

ELECTRICALLY HEATED FURNACE

Hermann Henke, Hanau-on-the-Main, Germany, assignor to G. Siebert Gesellschaft mit beschränkter Haftung, Hanau-on-the-Main, Germany, a German company Application March 27, 1936, Serial No. 71,322
In Germany April 1, 1935

1 Claim. (Cl. 13—25)

This invention relates to electrically heated furnaces.

The object of the invention is to provide a furnace with electrical resistance heating with the aid of heating elements composed of ceramic masses and through which an electric current flows, the said furnace being particularly suitable for the production of high temperatures, for example temperatures up to 2000° C. and more.

These and other objects of the present invention will be described more in detail in the following disclosure and will be shown in the accompanying drawing in which:

Fig. 1 shows diagrammatically a cross section through a furnace and the heating elements according to the present invention;

Fig. 2 is a longitudinal section through the furnace and heating elements; and

Fig. 3 is a diagrammatic view of the head of one of the heating elements shown in Figs. 1 and 2.

It has hitherto only been possible to produce temperatures above 1400° C. in furnaces with resistance heating by employing resistance elements of carbon, graphite, molybdenum and the like. It is necessary however in this case to protect the resistance elements from contact with oxygen from the air, for example by effecting a complete seal against the entry of air or by employing protective gases, which requires cumbersome apparatus.

It has hitherto not been possible to produce furnace temperatures higher than about 1400° C. with resistance elements composed of ceramic masses. Since the extraordinarily high electrical resistance at ordinary temperature of highly refractory oxides suitable for the production of very high temperatures renders them unsuitable for use as resistance material, attempts have been made to increase the conductivity of such substances in the cold by admixing powdered metals or oxides which are not highly refractory but conduct better in the cold. Such mixtures however possess the disadvantage that their softening temperatures are too low owing to the addition of the less refractory substances to the highly refractory substances and their resistance constantly increases on repeated use, because the admixed less refractory oxides, such as the oxides of iron, cobalt, chromium, nickel, titanium and uranium, volatilize at the high furnace temperature owing to their relatively high vapour pressure until finally practically nothing is left of them in the resistance mass.

Furthermore many of the aforesaid oxides, which conduct at ordinary temperature, at elevated temperature undergo changes of a chemical and/or physical nature, these changes being attended by an alteration in their electric conductivity, as for example in the case of ferrous oxide which in a cold condition conducts relatively well but which on heating is converted into practically non-conducting ferric oxide. Owing to the increase in the electrical resistance of the heating elements prepared from such oxide mixtures caused by the aforementioned behaviour of the oxides which conduct in the cold and are present in the aforesaid mixtures, the use of an increased voltage is necessary on each fresh heating up thereof, a fact which in itself renders the practical application extraordinarily difficult until the resistance has risen so high that conduction of current no longer takes place in the cold.

According to the invention these disadvantages of the known resistance elements composed of a ceramic mass are overcome by employing as heat resistances only those composed of highly refractory oxides or mixtures of such oxides, which owing to the constancy of their resistance properties at the high furnace temperatures enable the same furnace voltages to be continuously employed, for example normal voltages of 220 or 380, whereby the production of a conductivity sufficient for conducting current even at ordinary temperature is dispensed with and the ceramic heat resistances on setting the furnace in operation are first brought by a suitable source of heat to the temperature adapted to conduct the current at the prevailing voltage.

The use of the aforesaid highly refractory oxides with the exclusion of the unstable less refractory oxides enables considerably higher temperatures to be produced and the furnace to be operated both in an oxidizing and also in a neutral and a reducing atmosphere.

The following oxides and oxide mixtures are examples of those which may be employed according to the invention:

Oxides of zirconium, thorium, hafnium, magnesium, beryllium and aluminum and also oxides of the rare earth metals, such as oxides of scandium and yttrium and particularly cerium, as well as mixtures of zirconium oxides with magnesium oxide and yttrium oxide and also mixtures of thorium oxide with yttrium oxide, magnesium oxide, zirconium oxide and cerium oxide.

With regard to the nature and number of the components as well as the proportions thereof, the particular requirements and especially the temperature which it is desired to attain in the furnace will have to be taken into consideration in each individual case.

In order to produce extremely high temperatures heating elements may be employed which have been prepared from pure highly refractory oxides or from oxides containing only a small addition of other highly refractory oxides, by which the softening temperature and the melting point of the mixture are only slightly reduced. In such cases it is, however, advisable to employ for pre-heating these heating elements other heating elements prepared in accordance with the invention from mixtures of highly refractory oxides in other proportions, the said elements being adapted to conduct current at less elevated temperature than the pure oxides, whereby the last mentioned heating elements first conduct current under the action of the pre-heating exerted by wires and the like traversed by current and the heating elements prepared from the pure oxides are then brought by the latter to the temperature required for conducting current.

The resistance elements to be employed according to the invention may for example be prepared by mixing the oxides, if necessary in an entirely or partially pre-molten condition, then converting the mixture in a manner known per se into a suitable shape, for example into the shape of rods, tubes, plates or sheets, muffles or bands and calcining the resulting bodies in the usual manner.

According to this invention the current is fed to these resisting elements by firmly attaching wires, bands, foils or the like of a metal or alloy, which is stable at the furnace temperature, such as platinum, rhodium, iridium or other metals of the platinum group or alloys thereof, at the connecting points of the resistance elements, i. e., in the case of rod-shaped or tube-shaped bodies, for example, at the two ends thereof, this being, for example, effected by winding, after which the connecting points are coated with a sufficiently refractory ceramic mass, preferably the same mass of which the heating element is composed, and this coating is solidified by calcining.

If desired, openings may be provided in the resistance element for the reception and firmer attachment of the metallic terminals with the resistance element.

This type of contact offers the advantage that the heating elements together with the terminals can be disposed within the heated furnace space. In contradistinction thereto it was necessary in the known furnaces heated by resistance heating with the aid of ceramic, current-traversed heating elements, in order to protect the terminals made of less temperature-resistant metals from detrimental rises in temperature, to dispose the connecting points of these terminals with the ceramic heating elements outside of the heated furnace space, in order to keep the points of attachment as cool as possible, or alternatively to cool the points of contact projecting into the refractory masonry of the furnace between the not firmly attached metallic terminals and the ceramic resistance elements with water. It was necessary, particularly in the former case, to pass the ceramic heating elements from the point of contact through the entire masonry of the furnace, this arrangement as well as the cooling of the contact points by air or water giving rise to considerable heat losses.

In contradictinction thereto, when employing the heating elements according to the invention, which together with their terminals are disposed entirely inside the actual furnace space, whereby only the thin connecting wires, bands or the like need be passed through the furnace walls or furnace masonry and accordingly an appreciable fall in voltage cannot take place, practically the entire energy supplied to the furnace is utilized.

In addition the further advantage results of simplification in the construction of the furnace and reduction of the external mass of the furnace.

The pre-heating of the heating elements employed according to this invention, necessitated by the practically complete non-conductivity of the elements when cold, up to a temperature at which they sufficiently conduct current at the voltages available, for example 220 or 380 volts, may be effected in the most varied ways, for example by introducing into the furnace a pre-heated object or an object heated in the furnace by current-traversed wires or other, if desired ceramic, resistance elements or only a system of current-traversed heating elements until the ceramic heating elements of the furnace are heated to the desired temperature, after which the elements used for pre-heating are in general removed from the furnace. The pre-heating may however with advantage be effected by causing a hot gas, e. g. hot air, which may for example be heated inside the furnace in a pre-heating zone heated by electric resistance heating, for example with the aid of current-traversed wires or ceramic masses, or even outside the furnace, to act, preferably under circulation, on the ceramic heating elements to be preheated.

The heating of the gas may also be effected directly or indirectly by burning gaseous, liquid or solid fuels.

Referring to the drawing, 1 is the furnace casing prepared from a suitable refractory material and supported on legs 2. 3 are the heating elements disposed vertically on both sides of the interior of the furnace, at the ends 4 of which the connecting wires 5 are attached, which are connected outside of the furnace with the main current leads 6 and 7.

8 is an element consisting of chamotte and provided with a winding 9 serving for pre-heating, for example a chrome-nickel wire, which can be inserted into the furnace space and be again removed therefrom by the handle 10.

The furnace is operated according to the invention by introducing the element 8 into the furnace and passing current through the wire winding until the temperature in the furnace is such that the heating elements 3 connected by way of the main leads 6 and 7 to a source of current conduct the current, after which the pre-heating element 8 can be again removed from the furnace.

Fig. 3 is the heating element having a somewhat enlarged head 11. 5 is the connecting wire and 12 the coating of ceramic mass applied over the point of attachment.

What I claim is:

A furnace for producing high temperatures comprising a heating chamber having walls, a plurality of electric heating resistance elements wholly within said chamber and consisting of metal oxides electrically conductive only at high temperatures and with substantially constant electric resistance through successive heats, means for supplying in parallel connection electrical current to said elements, and connecting means extending from within said chamber through said walls and joining said supply means and said elements and consisting of metallic leads formed from the platinum group and capable of resisting the heat of said chamber.

HERMANN HENKE.